(12) United States Patent
McCaffrey

(10) Patent No.: US 8,943,796 B2
(45) Date of Patent: Feb. 3, 2015

(54) VARIABLE CYCLE TURBINE ENGINE

(75) Inventor: Michael G. McCaffrey, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 886 days.

(21) Appl. No.: 13/170,502

(22) Filed: Jun. 28, 2011

(65) Prior Publication Data

US 2013/0000314 A1 Jan. 3, 2013

(51) Int. Cl.
- F02C 3/10 (2006.01)
- F01D 13/00 (2006.01)
- F01D 17/16 (2006.01)

(52) U.S. Cl.
CPC ............ F01D 13/003 (2013.01); F01D 17/162 (2013.01); *Y02T 50/671* (2013.01)
USPC ................. 60/262; 60/226.1; 60/263; 60/801

(58) Field of Classification Search
CPC ....... Y02T 50/66; Y02T 50/671; F02K 3/077; F02K 3/075; F02K 3/06; F02K 3/065; F02K 3/072; F02C 3/067; F02C 9/22; B64D 2027/005
USPC .................................. 60/226.1, 262, 263, 801
See application file for complete search history.

(56) References Cited

U.S. PATENT DOCUMENTS

| | | | |
|---|---|---|---|
| 3,861,139 A * | 1/1975 | Jones | 60/226.1 |
| 4,080,785 A * | 3/1978 | Koff et al. | 60/226.3 |
| 4,171,183 A | 10/1979 | Cornell et al. | |
| 4,446,696 A | 5/1984 | Sargisson et al. | |
| 4,569,199 A | 2/1986 | Klees et al. | |
| 4,978,286 A | 12/1990 | Hurley | |
| 5,453,943 A | 9/1995 | Magliozzi | |
| 6,041,589 A | 3/2000 | Giffin, III et al. | |
| 6,968,701 B2 * | 11/2005 | Glahn et al. | 60/792 |
| 7,395,657 B2 * | 7/2008 | Johnson | 60/226.1 |
| 2008/0253881 A1 * | 10/2008 | Richards | 415/145 |
| 2009/0067978 A1 | 3/2009 | Suljak, Jr. | |
| 2010/0247293 A1 | 9/2010 | McCaffrey et al. | |
| 2011/0004388 A1 | 1/2011 | Winter | |
| 2011/0056183 A1 | 3/2011 | Sankrithi et al. | |
| 2011/0100014 A1 | 5/2011 | Hyde et al. | |

FOREIGN PATENT DOCUMENTS

| | | |
|---|---|---|
| CA | 1094527 A1 | 1/1981 |
| GB | 2100799 A | 1/1983 |
| GB | 2473530 A | 3/2011 |

* cited by examiner

*Primary Examiner* — Phutthiwat Wongwian
*Assistant Examiner* — Steven Sutherland
(74) *Attorney, Agent, or Firm* — Kinney & Lange, P.A.

(57) ABSTRACT

A gas turbine engine comprises a high spool, a low spool and an intermediate spool. The high spool comprises a high pressure turbine coupled to a high pressure compressor. The intermediate spool comprises an intermediate pressure turbine coupled to a ducted fan. The low spool comprises a low pressure turbine coupled to an open-rotor propeller. A variable area turbine section positioned between the intermediate pressure turbine and the low pressure turbine variable turbine section is configured to vary an expansion ratio across the intermediate pressure turbine to control rotational speeds of the low spool and the intermediate spool.

18 Claims, 4 Drawing Sheets

VARIABLE CYCLE TURBINE ENGINE

BACKGROUND

This invention relates generally to turbine engines, and specifically to turboprop and turbofan engines for aircraft. In particular, the invention concerns a, variable cycle turbine engine operating in mixed turboprop and turbofan modes.

Gas turbine engines provide efficient, reliable power for a wide range of applications, including aviation, industrial power generation, and commercial heating and cooling. Turbine engines (or combustion turbines) are built around a power core made up of a compressor, combustor and turbine, arranged in flow series with an upstream inlet and downstream exhaust. The compressor compresses air from the inlet, which is mixed which fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Large-scale gas turbine engines typically include a number of different compressor and turbine sections, which are arranged into coaxially nested spools. The spools operate at different pressures and temperatures, and rotate at different speeds.

Individual compressor and turbine sections are subdivided into a number of stages, which are formed of alternating rows of rotor blade and stator vane airfoils. The airfoils are shaped to turn, accelerate and compress the working fluid, and to generate lift for conversion to rotational energy in the turbine.

Aviation applications include turbojet, turbofan, turboprop and turboshaft engines. Turbojet engines are an older design, in which thrust is generated primarily from the exhaust. Modern fixed-wing aircraft typically employ turbofan and turboprop configurations, in which the low spool is coupled to a propulsion fan or propeller. Turboshaft engines are used on rotary wing aircraft, including helicopters.

Turboprop and turboshaft engines usually include reduction gearboxes to reduce blade tip speeds. The reduction ratio is generally higher for turboshaft engines, due to the larger size of the rotor. Advanced turbofan engines may also include geared drive mechanisms, providing independent fan speed control for reduced engine noise and increased operating efficiency.

Commercial and general-purpose military aircraft are typically powered by two- or three-spool turboprop and turbofan engines, in which the low spool is coupled to a propeller or propulsion fan. Turboprop engines typically employ open-rotor propeller blades, but ducted propellers and unducted turbofans are also known.

Turbofan engines are commonly divided into high and low bypass designs. High-bypass turbofans most of their thrust from the fan, which drives airflow through a bypass duct oriented around the engine core. Low-bypass turbofans generate more power from the core flow, providing greater specific thrust, but at some cost in noise and fuel efficiency. Low-bypass turbofans are used on supersonic jets and other high-performance aircraft In general, aircraft engine performance depends on precise control of the working fluid flow, and on the relative loading of the different spools. Turboprop and turbofan engines are subject to similar design considerations, but they operate at different airspeeds.

Open-rotor turboprops and unducted turbofans are also subject to substantial noise effects, as compared to turbofan engines, because the blade tips operate at supersonic speeds and there is no nacelle or fan duct to absorb sound. These issues are particularly relevant at higher speeds, where shock wave formation and loss effects are more pronounced, making it difficult to balance the relative contributions of turboprop and turbofan operations.

SUMMARY

This invention is directed to a three-spool gas turbine engine configured for variable cycle operations. The engine has a high spool, an intermediate spool and a low spool. The high spool includes a high pressure turbine coupled to a high pressure compressor, the intermediate spool includes an intermediate pressure turbine coupled to a ducted propulsion fan, and the low spool includes a low pressure turbine coupled to an open-rotor propeller.

A variable area turbine section is positioned between the intermediate pressure turbine and the low pressure turbine. The variable area turbine regulates the expansion ratio across the intermediate pressure turbine, in order to control the rotational speeds of the low and intermediate spools, and to balance loading and relative thrust output from the fan and propeller.

DETAILED DESCRIPTION

Figure 1:
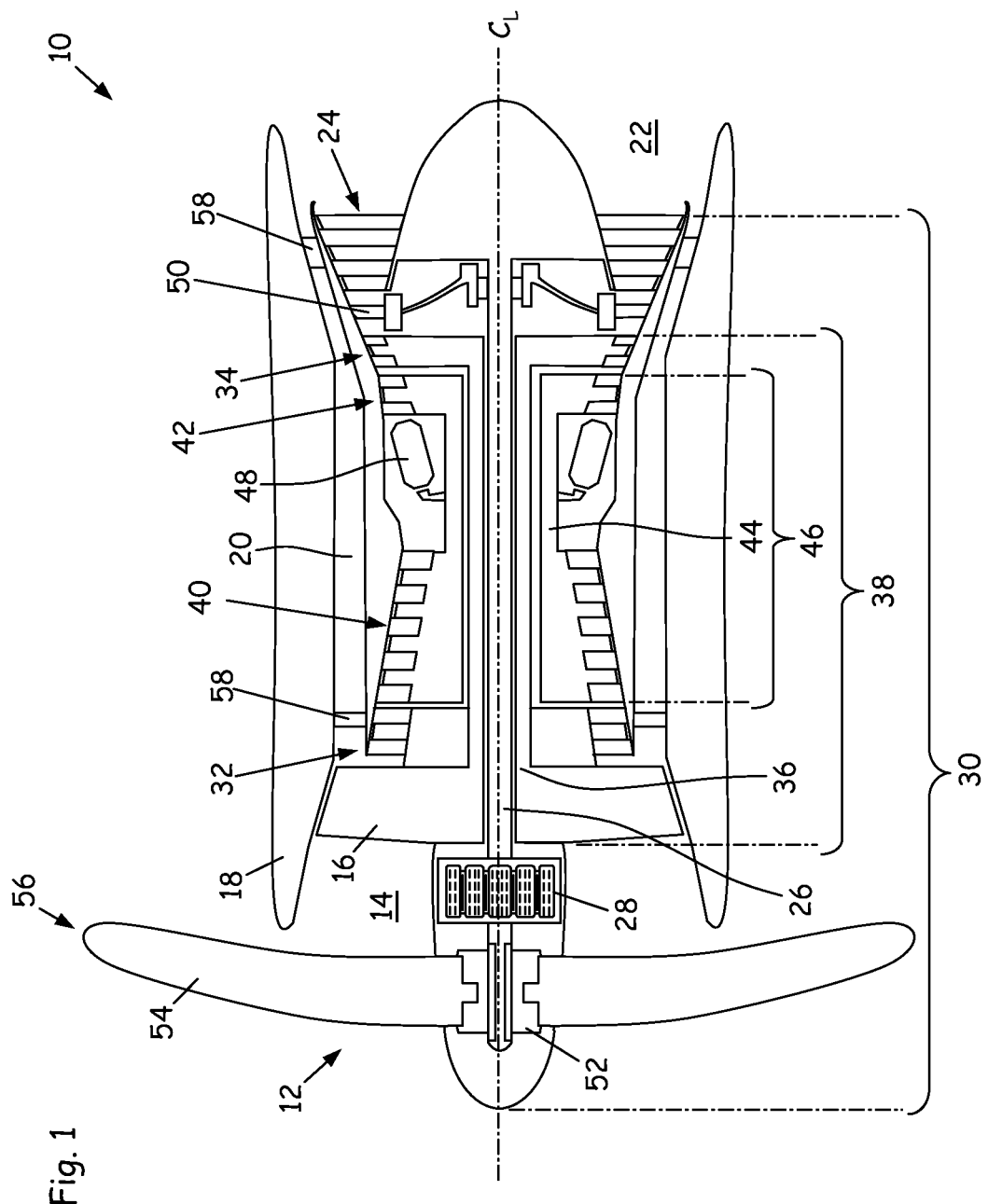
FIG. 1 is a cross-sectional schematic view of a variable cycle turbine engine, configured for takeoff.

FIG. 1 is a cross-sectional schematic view of gas turbine engine 10, in a variable cycle embodiment configured for takeoff at low forward speeds and airspeeds. Variable cycle turbine engine 10 includes open-rotor propeller 12, fan inlet 14 for ducted propulsion fan 16, and nacelle 18 with bypass duct 20 and exhaust nozzle 22.

Propeller 12 is rotationally coupled to low pressure turbine 24 via low pressure shaft 26 and reduction gearbox 28, forming low spool (or propeller spool) 30. Fan 16 and intermediate pressure compressor 32 are rotationally coupled to intermediate pressure turbine 34 via intermediate pressure shaft 36, forming intermediate spool (fan spool) 38. High pressure compressor 40 is rotationally coupled to high pressure turbine 42 via high pressure shaft 44, forming high spool 46.

High spool 46, intermediate spool 38 and low spool 30 each rotate about engine axis (or centerline) $C_L$, but at different speeds. Propeller 12 shares the same rotational axis $C_L$, and is coaxially mounted to low pressure shaft 26 with reduction gear 28. Fan 16 also rotates about centerline $C_L$, and is coupled to intermediate-compressor 32 on intermediate pressure shaft 36.

In counter-rotating (or contra-rotating) configurations, propeller 12 and low spool 30 rotate in one direction about centerline $C_L$, while fan 16 and intermediate spool 38 rotate in the other. This lowers the total angular momentum of turbine engine 10, and reduces coupling between fan 16 and propeller 12 at fan inlet 14.

Depending on the configuration of reduction gear 28, propeller 12 can also counter-rotate with respect to low pressure shaft 26 and the rest of low spool 30. In this configuration, propeller 12 counter-rotates with respect to fan 16, but the rest of low (propeller) spool 30 rotates in the same direction as intermediate (fan) spool 38.

In operation of turbine engine 10, compressed air from high pressure compressor 40 is mixed with air in combustor (or burner) 48, and ignited to produce hot combustion gas. High pressure turbine 42 generates rotational energy from the expanding combustion gas, driving high spool 46 and high pressure compressor 40. Intermediate pressure turbine 34 generates additional rotational energy from the combustion gas, driving intermediate spool 38 with intermediate pressure compressor 32 and propulsion fan 16. Propulsion fan 16 drives airflow through bypass duct 20 to generate thrust, and acts as a first-stage (low pressure) compressor.

Variable area turbine (VAT) section 50 is positioned between intermediate pressure turbine 34 and low pressure turbine 24. Variable area turbine section 50 includes a vane ring or nozzle segment with at least one stage of rotational (variable pitch) stator vane airfoils, spanning the turbine flow duct between inner and outer flow paths. An actuator is used to rotate the variable stator vanes, opening or closing the flow area between intermediate pressure turbine 34 and low pressure turbine 24.

Variable cycle turbine engine 10 utilizes variable area turbine section 50 to adjust the power output and work split between intermediate pressure (fan) spool 38 and low pressure (propeller) spool 30. In particular, variable area turbine section 50 allows turbine engine 10 to control spool loading and rotational speeds, balancing the relative thrust output of open-rotor propeller 12 and ducted fan 16.

When variable area turbine section 50 is actuated to close (decrease) the flow area, the expansion ratio decreases across intermediate pressure turbine 34 and increases across low pressure turbine 24. Low pressure (power) turbine 24 extracts more energy from the combustion gas, increasing rotational speed and loading for low spool 30, and generating more thrust from propeller 12. Intermediate pressure turbine 34 extracts less energy from the combustion gas, decreasing rotational speed and loading for intermediate spool 38, and generating less thrust from fan 16.

When variable area turbine section 50 is actuated to open (increase) the flow area, the expansion ratio increases across intermediate pressure turbine 34 and decreases across low pressure turbine 24. Intermediate pressure turbine 34 extracts more energy from the combustion gas, increasing rotational speed and loading for intermediate spool 38, and generating more thrust from fan 16. Low pressure turbine 24 extracts less energy from the combustion gas, decreasing rotational speed and loading for low spool 30, with less thrust from propeller 12.

Reduction gear 28 includes a planetary gear or other speed-reduction mechanism to lower the rotational speed of propeller blades 54 with respect to low spool 30. Typical reduction ratios are on the order of 10:1, depending on propeller speed, blade diameter, and engine operating characteristics. In the three-spool, variable cycle arrangement of turbine engine 10, variable area turbine section 50 provides additional spool speed control, and the reduction ratio may vary, for example between 5:1 and 15:1, or as low as 3:1 or 2:1.

Reduction gear 28 also has both fixed-ratio and variable-reduction configurations, in both co-rotating and counter-rotating designs. Alternatively, reduction gear 28 is not required, and propeller 12 is directly coupled to low pressure shaft 26. In this configuration, propeller 12 rotates at the same speed and in the same direction as low spool 30, with the spool speed and loading determined by variable area turbine section 50, as described above.

Variable pitch (or pitch-change) mechanism 52 couples propeller blades 54 to propeller 12. In general, pitch mechanism 52 includes a combination of geared, centrifugal or spring bias mechanisms to adjust the pitch of propeller 12 by rotating propeller blades 50 about a longitudinal or radial axis. Pitch mechanism 52 changes the pitch angle of propeller blades 54 to avoid stall, and to increase or decrease loading and thrust output based on airspeed.

During takeoff, pitch mechanism 52 can be actuated to reduce the (positive) pitch angle of propeller blades 54, increasing loading on propeller 12 to generate more thrust at low forward speed. During climb to cruise altitude, pitch mechanism 52 is actuated to increase the pitch angle of propeller blades 54 as airspeed increases. At cruise altitude, the pitch angle is adjusted to balance propeller and fan loading based on a combination of factors, including airspeed, forward velocity, rotor speed, noise considerations and engine efficiency.

In general, propellers and open rotor (unducted) fans generate thrust efficiently at low to moderate forward speeds, lower relative airspeeds and higher ambient pressures, for example during takeoff. As the aircraft climbs to cruise altitude, forward speed and airspeed increase, and higher rotational speeds are needed to generate thrust. As a result, tip regions 56 of propeller blades 54 operate in the transonic and supersonic regime, forming shock waves that reduce efficiency and create substantial amounts of noise.

Noise is an issue both on the ground and inside the passenger and crew cabins, where early open-rotor (unducted) propfan designs presented environmental concerns. To address these issues, variable cycle turbine engine 10 utilizes variable area turbine section 50 to shift power between low pressure (propeller) spool 30 and intermediate pressure (fan) spool 38, maintaining a performance balance that exceeds the operating capabilities of individual turboprop and turbofan designs. Variable area turbine section 50 also allows the magnitude of the turboprop/turbofan work split (or mode conversion) to be as great as possible, for increased efficiency and reduced noise at high and low airspeeds, and across a full range of spool speeds and engine operating conditions.

To define a particular work split, variable area turbine section 50 is actuated to adjust the expansion ratio across intermediate pressure turbine 34 and low pressure turbine 24. This controls the loading on intermediate spool 38, balancing the thrust output of fan 16 and propeller 12 in each region of the flight envelope. Adjustable pitch mechanism 52 plays a complementary role for low spool 30, increasing or decreasing the pitch of propeller blades 54 to control the loading on propeller 12. Variable fan area nozzle (VFAN) 58 controls the bypass ratio and fan pressure ratio across propulsion fan 16.

As shown in FIG. 1, variable cycle turbine engine 10 is configured for takeoff, where open-rotor propeller 12 operates at high propulsive efficiency and the variable cycle work split favors turboprop mode. Variable area turbine section 50 is actuated to a mid position to close or reduce the nozzle flow area, lowering the expansion ratio across intermediate pressure turbine 34 and reducing the loading on intermediate (fan) spool 38. This raises the expansion ratio across low pressure turbine 24, with increased loading on low pressure spool 30. In addition, pitch mechanism 52 is actuated to reduce the pitch angle of propeller blades 54, increasing the thrust output from propeller 12.

Variable fan nozzle 58 is positioned downstream of fan 16, in either a forward or aft (or mid) position along fan duct 20, as shown in FIG. 1. Variable fan nozzle 58 includes a variable stator or vane ring assembly, which is actuated to control the bypass ratio of turbine engine 10 by increasing or decreasing the flow area in fan duct 20.

Variable fan nozzle 58 provides additional control of the relative thrust output from intermediate (fan) spool 38 and low (propeller) spool 30. When variable fan nozzle 58 is actuated to open or increase the area of fan duct 20, bypass flow increases so that the bypass ratio is higher, and the fan pressure ratio decreases across propulsion fan 16. When variable fan nozzle 58 is actuated to close or reduce the area of fan duct 20, bypass flow decreases so that the bypass ratio is lower, and the fan pressure ratio increases.

In typical configurations of gas turbine engine 10, variable area turbine section 50 operates as the primary work-shift regulator between low turboprop and turbofan modes. In particular, variable area turbine section 50 provides the primary mechanism for regulating the pressure ratios across low pressure turbine 24 and intermediate pressure turbine 34, and for controlling the rotational speeds of low (propeller) spool 30 and intermediate (fan) spool 38. Pitch mechanism 52 and variable fan nozzle 58 are then actuated to rebalance rotational speeds and adjust the torque split between low spool 30 and intermediate spool 38, for additional control of the thrust and power output of open-rotor propeller 12 and ducted fan 16.

Figure 2:
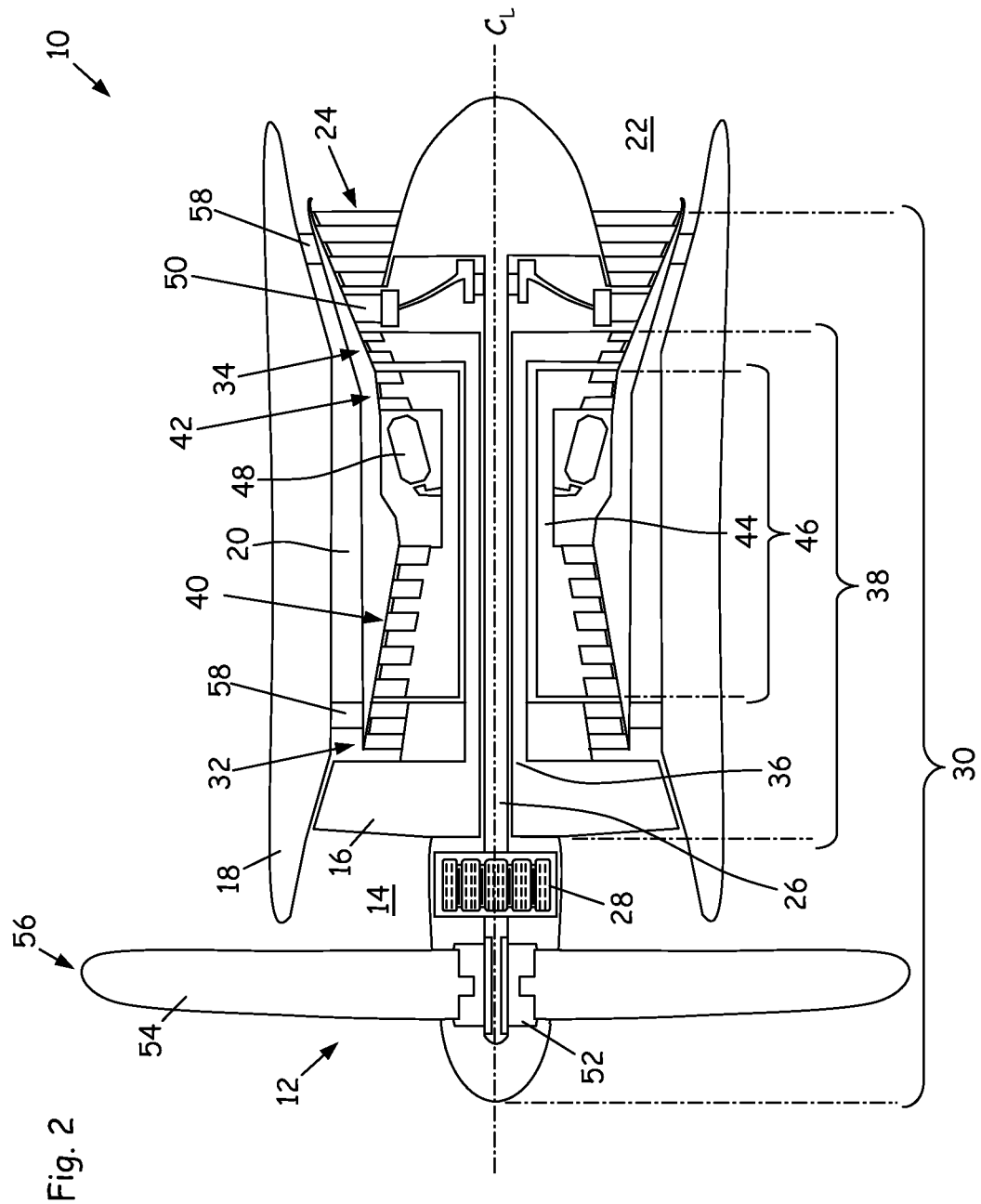
FIG. 2 is a cross-sectional schematic view of the variable cycle turbine engine, configured for climb.

FIG. 2 is a cross-sectional schematic view of variable cycle turbine engine 10, as configured for climb. In this configuration, variable area turbine section 50 is actuated to open the turbine flow area and increase loading on intermediate (fan) spool 38, with decreased loading on low (propeller) spool 30. Pitch mechanism 52 is actuated to increase the pitch angle of propeller blades 54. Variable fan nozzle 58 is actuated to increase the flow area through fan duct 20, increasing the bypass ratio and thrust output from fan 16.

As shown in FIG. 2, variable cycle turbine engine 10 combines the benefits of turboprop and turbofan engine operations, for efficient, low-noise operation over a wide range of spool speeds and flight conditions. In particular, open-rotor propeller 12 operates more quietly and efficiently at lower airspeed, while ducted fan 16 operates more efficiently at higher speeds. During the climb to cruise altitude, switching power to ducted fan 16 maintains thrust output while lowering the rotational speed of propeller 12, mitigating noise and increasing efficiency by reducing shock wave formation at tips 56 of propeller blades 54.

Ducted fan 16 operates at high propulsive efficiency in this regime, and the variable cycle work-split favors turbofan mode. Nacelle 18 also includes acoustic treatments to reduce noise from fan 16, while reducing weight and drag penalties by providing a substantially smaller cross-sectional profile than on a traditional high-bypass turbofan.

Lower turboprop rotational speeds can be maintained during cruise to reduce shock formation and attendant noise under high-speed conditions, where noise, efficiency and shock wave formation are of greatest concern. Both propeller 12 and ducted fan 16 can thus contribute to the total thrust, but the work split is shifted to reduce the speed of blade tips 56 so that the cabin is not assaulted by shock waves, and to reduce rotor noise to an acceptable level for the passenger and crew.

Variable cycle turbine engine 10 can also adjust the work split to switch between turbofan and turboprop modes of operation. Under high-speed flight conditions, for example, pitch mechanism 52 can be actuated to reduce the angle of attack (AOA) of propeller blades 54, reducing or eliminating propeller loading and thrust output. Variable area turbine section 50 shifts power to intermediate spool 38 and ducted fan 16, and turbine engine 10 operates substantially as a turbofan.

In turboprop mode, variable area turbine section 50 shifts power to low spool 30, and pitch mechanism 52 is actuated to decrease the pitch angle and increase loading on propeller 12. Variable fan nozzle 58 can also be actuated to close fan duct 20, reducing the bypass ratio.

Figure 3:
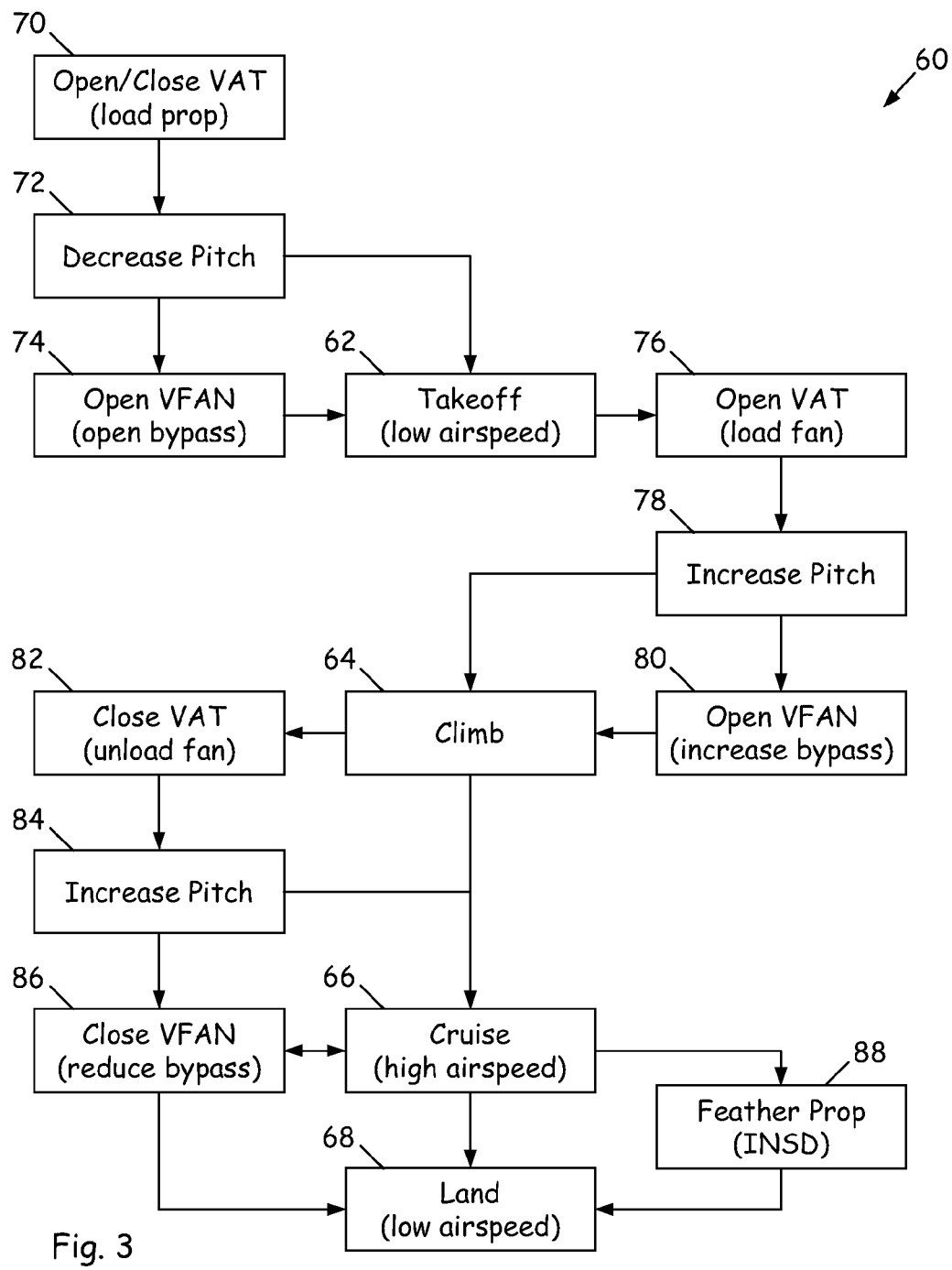
FIG. 3 is a schematic diagram of a method for operating a variable cycle turbine engine.

FIG. 3 is a schematic diagram illustrating method 60 for operating a variable cycle turbine engine. Method 60 comprises takeoff at low airspeed (step 62), climb to cruise altitude (step 64), cruise at high airspeed (step 66), and landing at low airspeed (step 68).

At takeoff (step 62), airspeed is low and the work-cycle split favors turboprop mode, with more thrust from the propeller and less from the fan, resulting in lower exhaust velocity and reduced fan noise. The variable area turbine section is opened or closed to set a mid position (step 70), loading the low (propeller) spool. The (positive) pitch angle is decreased (step 72) to stagger the propeller blades closed, nearly tangential, in order to match the slow airspeed.

In this configuration, the variable cycle turbine engine operates primarily as a turboprop, or in a partial turbofan mode. A variable fan area nozzle (VFAN) can also be utilized to open the bypass duct area (step 74), increasing the bypass ratio to produce additional thrust from the fan.

During climb (step 64), altitude and airspeed increase, and the work split is adjusted to maximize thrust by opening the variable area turbine (step 76) to shift power from the low spool (turboprop mode) to the intermediate spool (turbofan mode). The fan turns faster, and the propeller pitch is increased (step 78) to stagger the propeller blades open, more axial, matching the higher flight velocity.

In this configuration, the variable cycle turbofan engine operates in a mixed turbofan/turboprop mode. The fan diameter and bypass duct area can also be sized to provide additional flow, and the variable fan nozzle can be further opened (step 80) to increase the bypass ratio and provide additional thrust from the turbofan, if not already set at maximum during takeoff.

For cruise operations (step 66), altitude is steady and forward velocity is maintained at high airspeeds up to about Mach 0.8. Thrust demand is reduced, the gas generator is throttled back, and propeller speed is lowered to reduce shock wave formation and noise levels, as described above.

The variable area turbine can be actuated at cruise altitude to close the turbine flow area (step 82), decreasing loading on the fan. Propeller pitch is increased (step 84) to stagger the propeller blades partially or fully open, according to the higher airspeed.

The variable fan nozzle can be fully or partially closed (step 86) to reduce the fan duct area, consistent with reduced thrust requirements, or to balance the work split based on a combination of engine efficiency and noise concerns. The variable fan nozzle is also closed for descent and landing (step 68), shifting power to the propeller at lower airspeeds. In the event of a bird strike or other failure resulting in an in-flight engine shutdown (INSD), the propeller is typically feathered (step 88) to reduce windmilling.

Figure 4:
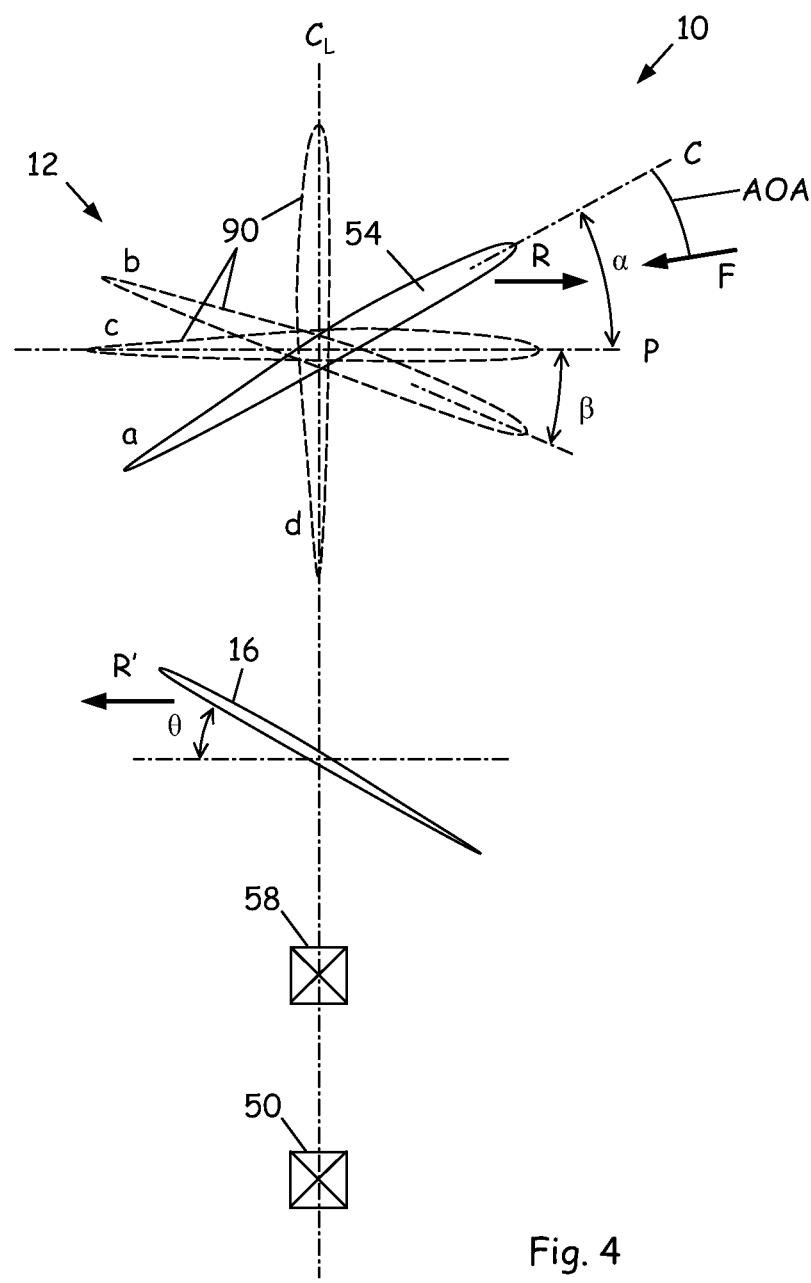
FIG. 4 is a schematic view of the variable cycle engine, illustrating pitch and loading configurations.

FIG. 4 is a schematic view of variable cycle turbine engine 10, illustrating pitch and loading configurations. Variable cycle turbine engine 10 comprises propeller 12 with open rotor blade 54 and ducted propulsion fan 16, as described above, with variable area turbine section 50 and variable fan nozzle 58 for additional load control.

Propeller 12 is shown in radial view, looking down toward axial centerline $C_L$ of turbine engine 10, approximately along the stacking axis of an individual blade 54. A number of different cross sections 90 (dashed lines) are shown, taken at a particular radial height (e.g., mid-span), representing blade 54 at different pitch angles.

Propeller 12 is coupled to the low spool, which drives open-rotor blades 54 in rotational direction R, perpendicular to centerline $C_L$. Normal (positive or forward) pitch angles α are measured counterclockwise from rotational plane P, and negative (reverse) pitch angles β are measured clockwise from rotational plane P.

The angle of attack (AOA) is the relative angle between air flow F over propeller airfoil sections 90 and mean camber line C. The pitch of blade 54 varies the AOA, so that for positive AOA forward (positive) thrust is produced and for negative AOA reverse (negative) thrust is produced. In the special case of zero degrees AOA, the pitch angle is equal to the airflow angle and there is no net thrust.

For rotating blades 54, a positive pitch angle may result in a zero AOA, if the rotational speed and forward flight speed result in a combined airflow angle that matches the pitch angle. The ability to change both the propeller angular velocity and pitch angle, in combination with the ability to change the work split between the intermediate and low pressure turbines, means the rotational speed at which the propeller turns is now independent of the net thrust being created by the combine propeller and fan, allowing the tip speed to be controlled for efficiency and noise control. In addition, the twist of propeller blades 54 is designed to accommodate high flow-through due to the operation of fan 16, across a range of different pitch settings.

In pitch position a, propeller blade 54 has normal (positive or forward) pitch angle α. In this position, propeller 12 generates positive thrust, where the angle of attack is positive, and blade 54 accelerates the air backward to increase or maintain forward speed. Propeller blade 54 typically has normal pitch angle α during takeoff, climb and cruise operations, and during forward taxiing on the ground.

In pitch position b, propeller blade 54 has reverse (negative) pitch angle β. In this position, propeller 12 generates negative thrust, where the angle of attack is negative and blade 54 accelerates air forward to slow or reverse the direction of the aircraft. Propeller blade 54 has negative pitch angles β during reversed taxiing operations on the ground. In some engine designs, negative pitch angles β are also used to slow the aircraft during approach and landing, or after touchdown.

In pitch position c, propeller blade 54 has substantially zero or flat pitch, and the angle of attack is close to zero. Cross section 90 is oriented substantially along rotational plane P, perpendicular to centerline $C_L$. In this position, propeller 12 generates little or no thrust. Propeller blade 54 typically has a flat pitch angle during engine startup, in order to minimize loading and prevent forward or backward motion of the aircraft.

In pitch position d, propeller blade 54 is feathered. Cross section 90 is oriented substantially along engine centerline $C_L$, perpendicular to rotational plane P. In this position, propeller 12 also generates little or no thrust, where the angle of attack of the blade is close to zero. In-flight forward velocity, combined with low propeller rotational speed, results in airflow that is essentially aligned with the engine centerline $C_L$. Propeller blades 54 are feathered to reduce rotational speeds, and prevent windmilling when the engines are turned off, either on the ground or in the event of a bird strike or other event requiring an in-flight engine shutdown.

Propulsion fan 16 is coupled to the intermediate spool. Fan 16 typically counter-rotates in direction R' with respect to propeller 12, at fixed (normal or forward) pitch angle θ. In this configuration, propulsion fan 16 accelerates airflow backward (downstream) through the fan duct, generating positive (forward) thrust.

Variable area turbine section 50 is positioned between the low pressure turbine and the intermediate pressure turbine, as shown in FIGS. 1 and 2 (above). Variable area turbine section 50 includes a variable vane ring or nozzle segment that is actuated to open or close the throat area of the turbine duct (or nozzle), regulating the work split and power output of the intermediate pressure (fan) spool and the low pressure (propeller) spool.

Variable fan nozzle 58 is positioned in the fan duct, downstream of propulsion fan 16. Variable fan nozzle 58 is actuated to increase or decrease the fan duct area, in order to regulate the bypass ratio and balance the relative thrust output from propulsion fan 16, as compared to propeller 12.

Table 1 illustrates pitch and loading configurations under different flight conditions for propeller 12, fan 16, variable area turbine (VAT) section 50, and variable fan area nozzle (VFAN) 58. For engine start, the pitch is flat and the propeller 12 generates little or no thrust. Variable area turbine section 50 is open, and variable fan nozzle 58 is closed.

When idling, the pitch of propeller 12 can be reversed (pitch angle β) to generate (low) negative thrust, offsetting the positive thrust contribution of (fixed-pitch) fan 16. This reduces the need for stationary braking, reducing wear and increasing service life. Variable area turbine section 50 is open, and variable fan nozzle 58 is closed.

TABLE 1

| Pitch and Loading Configurations | | | | | | | | | |
|---|---|---|---|---|---|---|---|---|---|
| | Start | Idle | Taxi | TO | Climb | Cruise | Descent | Land | IFSD |
| A/S | — | — | — | ≤250 kt | >250 kt | >250 kt | | <250 kt | |
| Prop Pitch | Flat | Rev β | Either α/β | Normal $α_1$ | Normal $α_2 > α_1$ | Normal $α_3 > α_2$ | Either α/β | Rev β | Feather |
| AOA | Zero | — | Either | + | + | + | Either | — | zero |
| Thrust | 0 | — (low) | +/− (low) | + (high) | + (med) | + (low) | +/− (low) | — | 0 |
| % | | | | 50-75% | 25-50% | 0-25% | ±25% | 50-100% | |
| Fan VFAN | Closed | Closed | Closed | Open | Open | Config | Open | Closed | Open |
| Thrust | + (low) | + (low) | + (low) | + (high) | + (med) | + | + (low) | +/− | (windmill) |
| % | | | | 25-50% | 50-75% | 75-100% | 75-100% | 0-50% | |
| Turbine VAT | Open | Open | Closed | Mid | Open | Open | Closed | Closed | Open |

Propeller pitch can also be used to control taxi speed and direction. To increase forward taxi speed, for example, propeller 12 is given normal (forward) pitch angle α, providing positive thrust. At reverse pitch angle β, propeller 12 offsets the forward thrust from fan 16, reducing forward speed or generating negative thrust to reverse the direction of the aircraft. During taxi, both variable area turbine section 50 and variable fan nozzle 58 are closed.

During takeoff (TO) and initial climb at airspeeds (A/S) of 250 knots (about 460 km/hr) or less, propeller 12 has normal (positive) pitch angle $α_1$, providing high positive thrust, typically 50-75% of the total. Fan 16 provides 25-50% of the total thrust, with variable fan nozzle 58 in the open position. Variable area turbine 50 can be set in a middle (mid) or intermediate position, between full open and full closed, in order to balance loading on propeller 12 and fan 16 for maximum climb performance.

For climb at airspeeds above 250 knots, the pitch angle of propeller 12 is increased to $α_2$, where (normal) pitch angle $α_2$ is typically greater during climb than pitch angle $α_1$ during takeoff (that is, $α_2 > α_1$). Propeller 12 provides 25-50% of the total thrust, and fan 16 provides 50-75%. Variable area turbine section 50 and variable fan nozzle 58 are both open.

During cruise, airspeed typically remains relatively high, above 250 knots. The pitch angle of propeller 12 is increased to $α_3 > α_2$, and variable fan nozzle 58 is closed down to a middle configuration, increasing fan efficiency while variable area turbine section 50 remains open. Propeller 12 provides anywhere from 0-25% of the total (positive) thrust, and fan 16 provides 75-100%.

For descent, the propeller pitch is varied according to desired airspeed and descent profile, and propeller 12 may have either forward (normal) pitch angle α or reverse pitch angle β. In particular, it is possible to reverse the propeller pitch during flight to generate negative thrust of up to 25%, for example to increase the descent rate for military aircraft, or for commercial operations in mountainous areas. Variable area turbine section 50 is typically closed, and variable fan nozzle 58 is open.

During landing, propeller 12 may have reverse pitch angle β, and both variable area turbine section 50 and variable fan nozzle 58 can be closed. In a reverse-pitch landing configuration, propeller 12 can provide up to 50-100% negative thrust, offsetting up to 50% positive thrust from fan 16. In some engines, a thrust reverser is used to reverse the bypass flow when propeller 12 does not generate sufficient negative thrust to meet airframe and braking distance requirements.

For in-flight engine shutdown (IFSD), propeller 12 is feathered to reduce rotation, and variable area turbine section 50 and variable fan nozzle 58 are both opened. Depending on failure condition, there may still be some windmilling of fan 16.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. A gas turbine engine comprising:
a high spool, the high spool comprising a high pressure turbine coupled by a high pressure shaft to a high pressure compressor;
an intermediate spool, the intermediate spool comprising an intermediate pressure turbine disposed axially aft of the high pressure turbine and coupled by an intermediate pressure shaft to a ducted fan disposed axially forward of the high pressure compressor;
a low spool, the low spool comprising a low pressure turbine disposed axially aft of the intermediate pressure turbine and coupled by a low pressure shaft to an open-rotor propeller disposed axially forward of the ducted fan;
a variable area turbine section positioned between the intermediate pressure turbine and the low pressure turbine, wherein the variable area turbine section varies an expansion ratio across the intermediate pressure turbine to control rotational speeds of the low spool and the intermediate spool; and a fan duct extending from a position just aft of the fan to an exhaust nozzle of the gas turbine engine disposed axially aft of the low pressure turbine, wherein the ducted fan generates thrust by driving bypass flow through the fan duct.

2. The engine of claim 1, wherein the high spool, the intermediate spool and the low spool rotate about a common axis.

3. The engine of claim 2, wherein the open-rotor propeller rotates about the common axis with the high spool, the low spool and the intermediate spool.

4. The engine of claim 1, wherein the variable area turbine section varies the expansion ratio to balance thrust contributions of the open-rotor propeller and the ducted fan based on the rotational speeds of the low spool and the intermediate spool.

5. The engine of claim 4, further comprising a reduction gear coupling the low spool to the open-rotor propeller, wherein the reduction gear reduces a rotational speed of the propeller with respect to the low spool.

6. The engine of claim 4, wherein the propeller comprises a plurality of propeller blades and further comprising a variable pitch mechanism coupled to the propeller blades.

7. The engine of claim 6, wherein the variable pitch mechanism adjusts a pitch of the propeller blades to control loading on the propeller based on airspeed.

8. The engine of claim 1, further comprising a variable vane positioned in the fan duct axially aft of the fan, wherein the variable vane adjusts a flow area of the fan duct to regulate thrust generated by the fan.

9. A variable cycle turbine engine comprising:
a high spool, the high spool comprising a high pressure turbine coupled to a high pressure compressor;
a fan spool coaxial with the high spool, the fan spool comprising an intermediate pressure turbine coupled to a ducted fan;
a propeller spool coaxial with the high spool and the fan spool, the propeller spool comprising a power turbine disposed axially aft of the intermediate pressure turbine and coupled to an open-rotor propeller disposed axially forward of the ducted fan;
a variable area turbine between the intermediate pressure turbine and the power turbine, wherein the variable area turbine varies an expansion ratio of the intermediate pressure turbine to control loading on the fan spool and the propeller spool.

10. The turbine engine of claim 9, further comprising a variable pitch mechanism coupled to the propeller, wherein the variable pitch mechanism varies a pitch angle of the propeller to control loading on the propeller spool; and a bypass duct coaxial with the fan spool, the bypass duct comprising a variable fan nozzle downstream of the ducted fan.

11. The turbine engine of claim 9, wherein the variable fan nozzle varies a flow area of the bypass duct to control a bypass ratio of the turbine engine.

12. The turbine engine of claim 9, further comprising a reduction gearbox coupling the propeller to the propeller spool.

13. The turbine engine of claim 12, wherein the reduction gearbox coaxially couples the propeller to the propeller spool, such that the propeller shares a rotational axis with the propeller spool and the fan spool.

14. A method of turbine operation, the method comprising:
rotating a fan spool about an axis, the fan spool comprising an intermediate pressure turbine coupled to a ducted fan that drives a bypass flow through a fan duct
counter-rotating a propeller spool about the axis, the propeller spool comprising a power turbine disposed aft of the intermediate pressure turbine and coupled via a reduction gearbox to an open-rotor propeller disposed axially forward of the ducted fan;
controlling an expansion ratio across the fan spool by actuating a variable area turbine section disposed between the intermediate pressure turbine and the power turbine; and
shifting power between the fan spool and the propeller spool, based on the expansion ratio.

15. The method of claim 14, further comprising adjusting the variable area turbine section and setting a pitch angle of the propeller to load the propeller spool for takeoff.

16. The method of claim 14, further comprising opening the variable area turbine section to load the fan spool for climbing.

17. The method of claim 16, further comprising increasing a pitch angle to reduce loading on the propeller for cruising.

18. The method of claim 17, further comprising closing a variable fan nozzle to reduce bypass flow during cruising.

* * * * *